US011135612B2

United States Patent
Henderson et al.

(10) Patent No.: US 11,135,612 B2
(45) Date of Patent: Oct. 5, 2021

(54) ROTATING APPLICATORS HAVING FLUID DISPENSERS

(71) Applicant: The Boeing Company, Chicago, IL (US)

(72) Inventors: Raymond Neil Henderson, Renton, WA (US); Joshua Andrew Babst, Enumclaw, WA (US); Kevin Michael Bell, Maple Valley, WA (US); Brian Joseph Wimer, Bothell, WA (US)

(73) Assignee: The Boeing Company, Chicago, IL (US)

( * ) Notice: Subject to any disclaimer, the term of this patent is extended or adjusted under 35 U.S.C. 154(b) by 43 days.

(21) Appl. No.: 16/358,243

(22) Filed: Mar. 19, 2019

(65) Prior Publication Data

US 2020/0298268 A1    Sep. 24, 2020

(51) Int. Cl.
| | |
|---|---|
| *B05C 5/02* | (2006.01) |
| *B25J 11/00* | (2006.01) |
| *B05C 1/06* | (2006.01) |
| *B24B 53/013* | (2006.01) |
| *B24B 41/00* | (2006.01) |
| *B24B 53/017* | (2012.01) |
| *B05B 13/04* | (2006.01) |
| *B05C 1/02* | (2006.01) |

(52) U.S. Cl.
CPC .......... *B05C 5/027* (2013.01); *B05B 13/0431* (2013.01); *B05C 1/027* (2013.01); *B05C 1/06* (2013.01); *B05C 5/0216* (2013.01); *B24B 41/005* (2013.01); *B24B 53/013* (2013.01); *B24B 53/017* (2013.01); *B25J 11/0065* (2013.01); *B25J 11/0075* (2013.01)

(58) Field of Classification Search
CPC ............................ B05C 1/06; B25J 11/0075
See application file for complete search history.

(56) References Cited

U.S. PATENT DOCUMENTS

| | | | | | |
|---|---|---|---|---|---|
| 1,475,079 | A | * | 11/1923 | Miller | ................ A47L 11/4069 15/24 |
| 3,084,069 | A | * | 4/1963 | Werner | ..................... B05C 1/06 118/259 |
| 3,427,840 | A | * | 2/1969 | Richter | ..................... B05C 1/06 118/266 |
| 4,879,966 | A | * | 11/1989 | Gourronc | ................. B05C 1/06 118/207 |
| 4,932,349 | A | * | 6/1990 | Gohon | ...................... B05C 1/06 114/222 |
| 5,171,095 | A | * | 12/1992 | Davies | ..................... B05C 1/00 401/47 |

(Continued)

*Primary Examiner* — Binu Thomas (74) *Attorney, Agent, or Firm* — Hanley, Flight & Zimmerman, LLC (57) ABSTRACT

Rotating applicators are disclosed. A disclosed example apparatus includes an inlet to receive a surface coating to be applied to a surface of a workpiece, a shaft having a fluid channel extending therethrough, where the fluid channel is in fluid communication with the inlet, and an applicator coupled to an end of the shaft, where the applicator has an opening in fluid communication with the fluid channel. The apparatus also includes a pump to cause the surface coating to flow from the inlet to the opening, and a motor to rotate the shaft while the applicator dispenses the surface coating from the opening.

20 Claims, 8 Drawing Sheets

(56) References Cited

U.S. PATENT DOCUMENTS

| | | | |
|---|---|---|---|
| 6,331,136 B1* | 12/2001 | Bass | B24B 37/042 |
| | | | 451/41 |
| 7,544,113 B1 | 6/2009 | Benner | |
| 10,035,237 B2 | 7/2018 | Panergo et al. | |
| 2001/0038039 A1* | 11/2001 | Schultz | B05B 13/0421 |
| | | | 239/1 |
| 2006/0205324 A1* | 9/2006 | Mayes | B24B 53/017 |
| | | | 451/21 |
| 2014/0234011 A1* | 8/2014 | Tomuta | B05C 1/02 |
| | | | 401/289 |
| 2016/0175883 A1* | 6/2016 | Tomuta | A46B 11/06 |
| | | | 401/282 |
| 2017/0105513 A1* | 4/2017 | Davancens | A46B 13/04 |

* cited by examiner

ROTATING APPLICATORS HAVING FLUID DISPENSERS

FIELD OF THE DISCLOSURE

This disclosure relates generally to manufacturing processes and, more particularly, to rotating applicators.

BACKGROUND

To fill sometimes unseen surface defects (e.g., cavities, scratches, openings, etc.) on a surface of a workpiece (e.g., a produced component, a mid-production component, etc.) with a dispensed surface coating or treatment (e.g., a paint, wax, a surface filler, etc.), manual operations are typically employed. In some manual operations, a surface coating is first applied onto a surface of a workpiece and, subsequently, the surface coating is rubbed and/or wiped to ensure proper filling of surface defects. The manual operations to fill the surface defects can be labor-intensive, thereby taking a relatively long time to finish and, thus, can result in relatively low production throughput. Further, the repetitive motions and/or body movements associated with these manual operations are undesirable.

SUMMARY

An example apparatus includes an inlet to receive a surface coating to be applied to a surface of a workpiece, a shaft having a fluid channel extending therethrough, where the fluid channel is in fluid communication with the inlet, and an applicator coupled to an end of the shaft, where the applicator has an opening in fluid communication with the fluid channel. The apparatus also includes a pump to cause the surface coating to flow from the inlet to the opening, and a motor to rotate the shaft while the applicator dispenses the surface coating from the opening.

An example effector for use with a robot includes a mount to removably couple the effector to the robot, an inlet to receive surface coating to be dispensed to a surface of a workpiece, an applicator having an opening, a pump to cause the surface coating to flow from the inlet to the opening, and a motor to rotate the applicator while the surface coating is dispensed from the opening and onto the surface.

An example method of operating an effector to apply a surface coating to a surface of a workpiece includes moving, via instructions executed by a processor, the effector relative to the surface of the workpiece, rotating, via a motor, an applicator at a distal end of the effector, and dispensing the surface coating from an opening of the applicator to the surface while the applicator is rotated.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part is in any way on (e.g., positioned on, located on, disposed on, or formed on, etc.) another part, indicates that the referenced part is either in contact with the other part, or that the referenced part is above the other part with one or more intermediate part(s) located therebetween. Stating that any part is in contact with another part means that there is no intermediate part between the two parts. Although the figures show layers and regions with clean lines and boundaries, some or all of these lines and/or boundaries may be idealized. In reality, the boundaries and/or lines may be unobservable, blended, and/or irregular.

The descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Rotating applicators are disclosed. Some known surface coating systems and/or manufacturing process implementations rely on manual operations (e.g., manual labor performed by operators). In particular, manual operations are typically performed in processes in which defects of workpiece surfaces are filled. However, these manual operations can be time-consuming, thereby resulting in relatively low manufacturing throughput.

Examples disclosed enable effective, relatively low-cost and quick application of surface coatings onto manufacturing workpiece surfaces, for example. Examples disclosed herein utilize an applicator (e.g., an applicator brush, an applicator pad, etc.), which includes an opening to dispense a surface coating onto a workpiece surface. In particular, the applicator is placed into contact with the workpiece surface and rotated as the surface coating is dispensed from the opening to effectively apply the surface coating onto the surface.

In some examples, the surface coating is applied onto the aforementioned surface to fill defects (e.g., microscopic holes, scratches, etc.) of the surface. In some examples, the applicator includes multiple openings to dispense the surface coating. In some examples, the applicator has a generally circular shape. In some such examples, multiple openings are arranged concentrically and/or at equiangular intervals relative to the circular shape. In some examples, a shaft that is operatively coupled to the applicator is rotated via a motor. In some examples, the shaft includes a fluid channel extending therethrough. Additionally or alternatively, at least one gear is implemented to transfer rotational movement between the motor and the shaft, for example. In some examples, a drive belt or drive chain (e.g., a drive chain with different sized sheaves or sprockets) is implemented for rotation transfer and gear reduction.

As used herein, the term "effector" refers to a movable portion of a production device (e.g., a robot) that is to perform a designated function (e.g., moving and/or manipulating). Accordingly, the term "effector" can refer to a movable portion that is articulated by a robot. As used herein, the term "applicator" can refer to a device, component and/or assembly used to apply a coating and/or a treatment to a surface. As used herein, the term "workpiece" refers to a part, component and/or assembly being produced or finished (e.g., a mid-production component or assembly, a semi-finished part, a part to be surface finished, a completed part, etc.). As used herein, the term "surface coating" refers to a substance, such as a fluid, a liquid and/or a coating, that is applied onto a surface to coat the surface, finish the surface, alter aesthetics of the surface and/or fill defects of the surface. Accordingly, the term "surface coating" can refer to a paint, a primer, a wax, a surface filler, a protective coating, etc.

Figure 1:
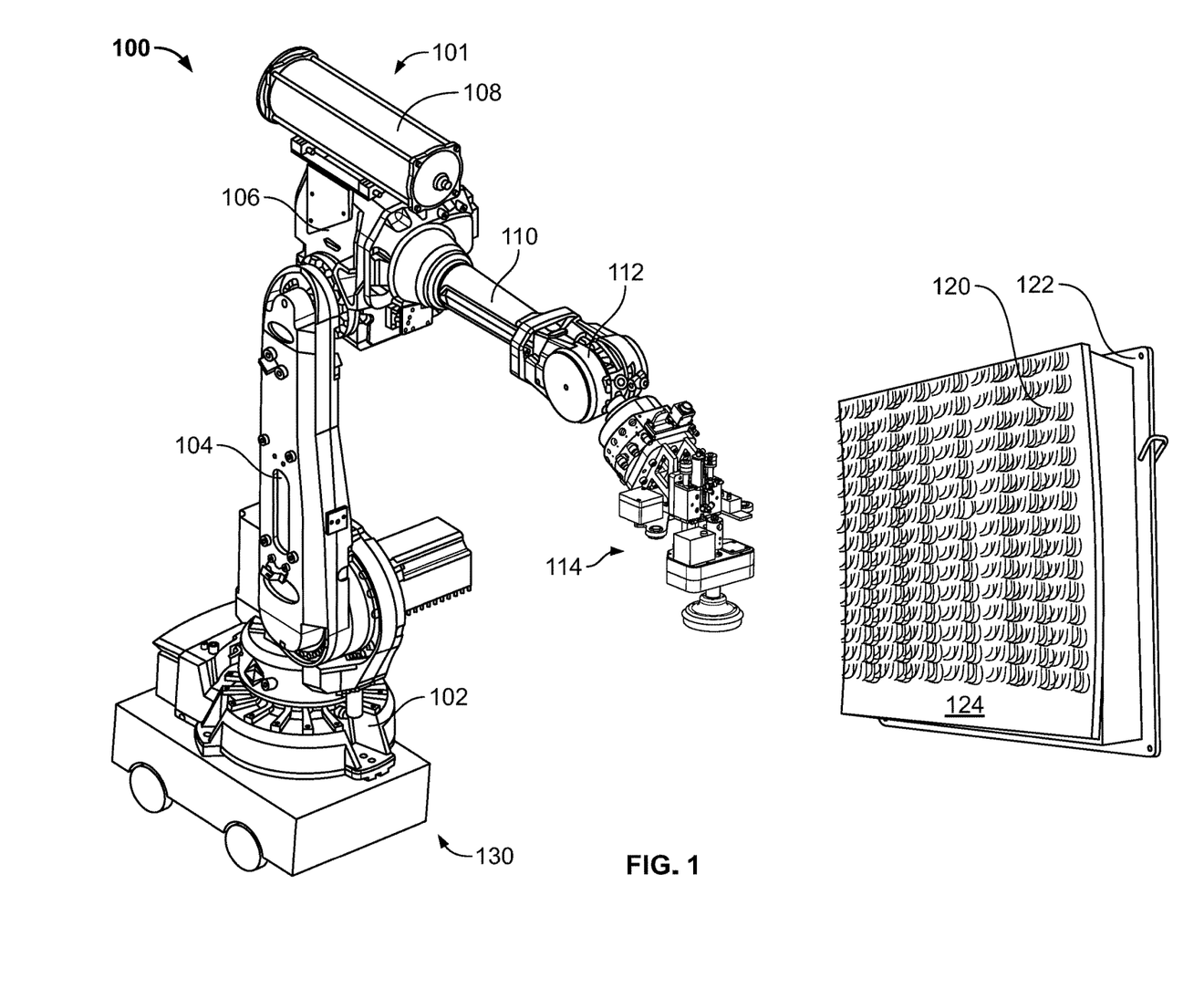
FIG. 1 illustrates an example surface coating application system in accordance with teachings of this disclosure.

FIG. 1 illustrates an example surface coating application system 100 in accordance with teachings of this disclosure. The surface coating application system 100 of the illustrated example includes a robot (e.g., a means for positioning and aligning) 101, which includes a support base 102, an arm (e.g., a pivot arm) 104, a movable effector support (e.g., a rotatable effector support) 106, a filler tank pump 108, an extension arm 110, a rotatable joint 112 and an effector (e.g., a detachable effector, a removably couplable effector, an end effector, etc.) 114. In this example, the robot 101 is depicted proximate a workpiece 120 that is held and mounted by a fixture 122. In this particular example, the workpiece 120 includes a surface 124 that exhibits a generally curved shape.

In operation, to bring the effector 114 proximate the workpiece 120, the robot 101 is translationally moved relative to the workpiece 120 and the fixture 122. In turn, the arm 104 can swivel and angle relative to the support base 102. In this example, the effector support 106 and the extension arm 110 are moved while the effector 114 is rotated about multiple axes, via the rotatable joint 112, to bring the effector 114 within a desired position and orientation relative to the workpiece 120.

To apply a surface coating stored by the filler tank pump 108 to the surface 124, the effector 114 is brought toward the workpiece 120 so that at least a portion of the effector 114 comes into contact with the surface 124. In this example, the effector 114 is moved across the surface 124 along a movement pattern generally defined by horizontal rows (in the view of FIG. 1). As will be discussed in greater detail below in connection with FIGS. 2-7, the surface coating is dispensed by an applicator 224 (shown in FIG. 2) positioned at a distal end of the effector 114, for example. In particular, the applicator 224 is rotated while the applicator 224 contacts and is moved across the workpiece 120.

In some examples, the support base 102 is mounted to a movable base (e.g., a self-propelled movable base) 130. In some such examples, the movable base 130 is used to move the robot 101 relative to the workpiece 120 and the fixture 122 and serves as a storage area in which different effectors are located (e.g., so that different effectors can be selected and coupled to the robot 101).

Figure 2:
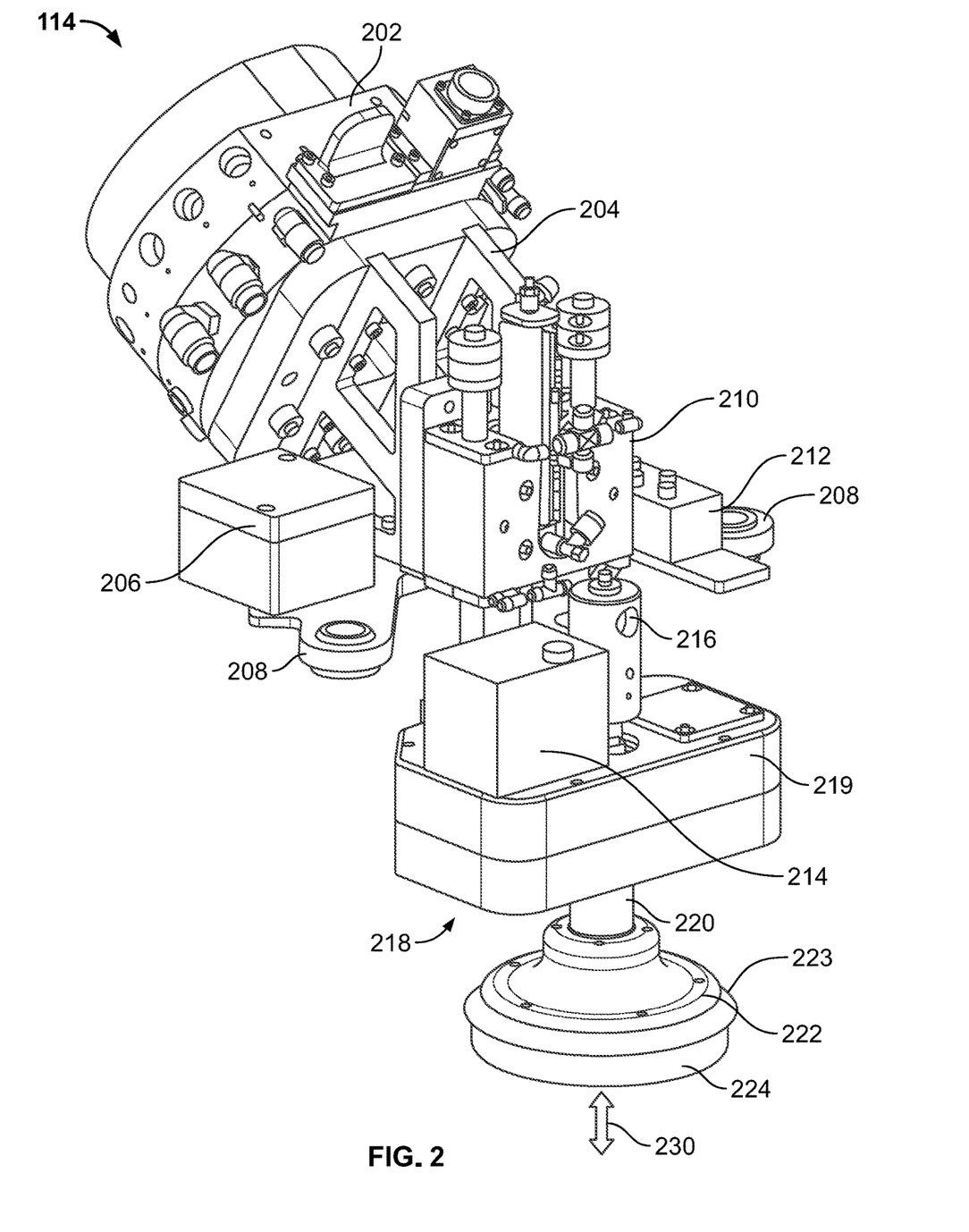
FIG. 2 is a detailed perspective view of an example effector of the example surface coating application system of FIG. 1.

FIG. 2 is a detailed perspective view of the example effector 114 of the example application system 100 of FIG. 1. The effector 114 of the illustrated example includes a mounting portion (e.g., a quick change attachment portion, an interchange portion, a mount, a mounting portion, etc.) 202, a frame 204, an identification module 206, storage mounts 208, an actuator 210, an electrical input/output (I/O) module 212, a motor 214, a rotary union 216, a drivetrain 218 having a case 219, a central shaft (e.g., a rotatable shaft, a means for rotating) 220, a shaft flange 222 and the aforementioned applicator (e.g. a means for dispensing surface coating to a workpiece) 224, which is implemented as a foam brush or pad in this example. In some examples, the shaft flange 222 mounts a backing pad (e.g., a support pad) 223 which, in turn, mounts and aligns the applicator 224.

To provide surface coating to the workpiece 120 via the applicator 224, the effector 114 is moved and oriented by the robot 101 and/or the actuator 210 toward the workpiece 120. As a result, the applicator 224 is positioned and oriented relative to a curvature of the workpiece 120 to contact the surface 124 so that the surface coating can be effectively applied thereto. As will be described in greater detail below in connection with FIG. 4, the applicator 224 is rotated while the surface coating is dispensed therefrom.

In some examples, the shaft flange 222 and the applicator 224 can be moved along a longitudinal direction by the robot 101, the actuator 210 and/or the effector 114, as generally indicated by a double arrow 230. In particular, moving the shaft flange 222 and the applicator 224 in the longitudinal direction enables a pressure applied by the applicator 224 to the workpiece 120 to be adjusted. In this example, the pressure applied by the applicator 224 is varied by movement (e.g., linear movement) of the actuator 210. In some examples, the actuator 210 moves the applicator 224 to follow a curvature of the surface 124 (e.g., to follow small deviations or variations of the surface 124). In some examples, the actuator 210 moves the applicator 224 toward the surface 124 to correct for programming errors (e.g., errors associated with programming the robot 101, positional or tolerance errors, etc.).

Figures 3A, 3B:
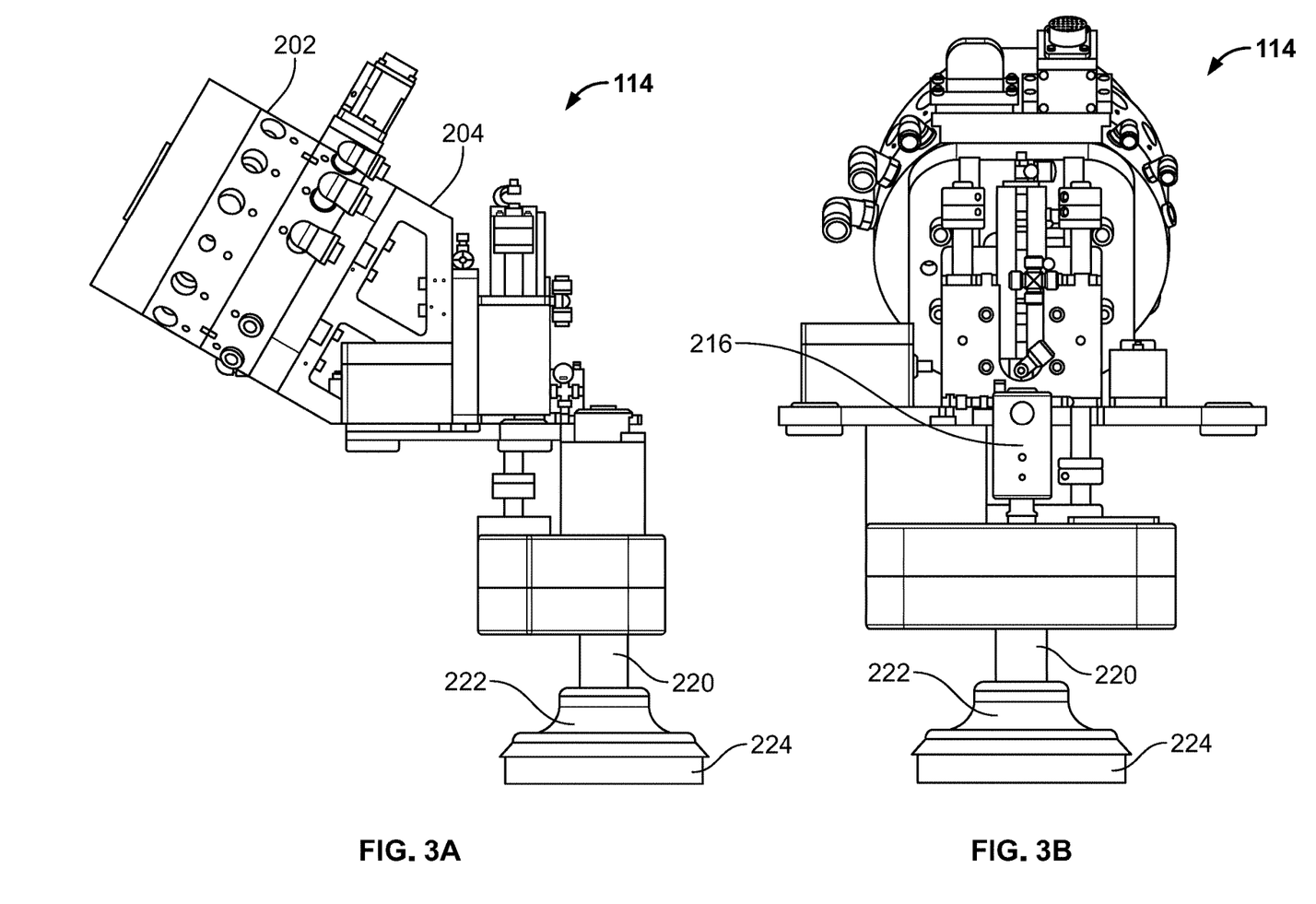
FIGS. 3A and 3B are side and front views, respectively, of the example effector of FIG. 2.

FIGS. 3A and 3B are side and front views, respectively, of the example effector 114 of FIG. 2. Turning to FIG. 3A, the mounting portion 202 of the illustrated example is angled relative to the central shaft 220 (e.g. angled 30 to 60 degrees from the central shaft 220) based on a shape and/or geometry of the frame 204 (e.g., the frame 204 has an angled contact surface). Further, the shaft flange 222 and the applicator 224 are longitudinally aligned with the central shaft 220 in this example. In other examples, the central shaft 220, the shaft flange 222 and the applicator 224 are not angled relative to the mounting portion 202.

FIG. 3B shows the example effector 114 from a front perspective. As can be seen in the illustrated example of FIG. 3B, the rotary union 216 is generally aligned (e.g., axially aligned) with the central shaft 220, the shaft flange 222 and the applicator 224.

Figure 4:
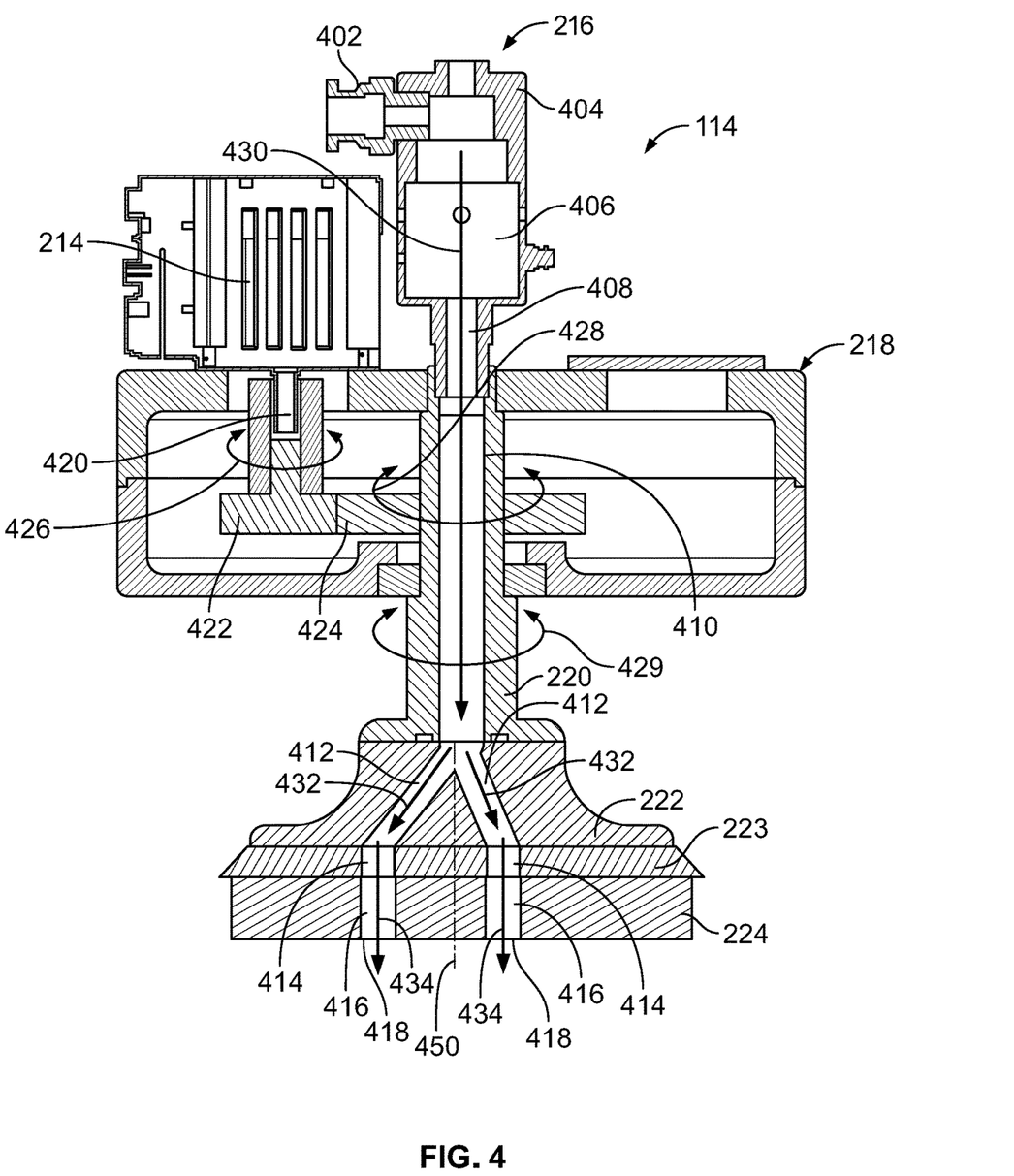
FIG. 4 is a cross-sectional view of the example effector of FIGS. 2-3A.

FIG. 4 is a cross-sectional view of the example effector 114 of FIGS. 2-3B. The effector 114 of the illustrated example includes an inlet 402, a movable portion 404 of the rotary union 216 with internal channels (e.g., cavities, fluid channels, apertures) 406, 408, the central shaft 220 with a corresponding internal fluid channel (e.g., a fluid channel that is an internal cavity defined by an exterior diameter of the central shaft 220) 410, the shaft flange 222 having diverging channels 412 extending therethrough. In particular, the diverging channels 412 are angled relative to one another (e.g., angled at 15 to 40 degrees from one another, 25 to 35 degrees from one another, 0 to 80 degrees from one another). In this example, the backing pad 223 and the applicator 224 both have channels 414, 416, respectively, extending therethrough. Further, the channels 416 of the applicator 224 define openings (e.g., exterior openings, outlet openings, etc.) 418. In this example, the motor 214 includes a pinion 420 operatively coupled to gears 422, 424 of the drivetrain 218.

To rotate or spin the applicator 224 when the applicator 224 is in contact with the surface 124 of the workpiece 120, a signal is provided to the motor 214 to cause the pinion 420 to rotate which, in turn, rotates the gears (e.g., gear systems, gear assemblies, etc.) 422, 424. In particular, rotation of the pinion 420, as generally indicated by a double arrow 426, is translated to rotational motion of the gear 424, as generally indicated by an arrow 428. As a result, the central shaft 220 rotates along a direction generally indicated by an arrow 429, thereby causing the shaft flange 222, the backing pad 223 and the applicator 224 to rotate. In this example, the applicator 224 is compressed (e.g. partially compressed) by the actuator 210 against the surface 124 of the workpiece 120 while the applicator 224 spins. Further, in this example, the inlet 402 and the chamber 404 remain relatively stationary while the central shaft 220 rotates.

To dispense a surface coating from the openings 418 of the applicator 224 and onto the workpiece 120 as the applicator 224 is rotated, the actuator 210 moves (e.g., linearly moves, translates, etc.) the applicator 224 into contact with the workpiece 120 while the filler tank pump 108 causes the surface coating to flow from the filler tank pump 108, and into the inlet 402 (e.g. via a piston of the filler tank pump 108 that is moved by fluid pressure). In turn, the surface coating flows into the channels 406, 408, 410, as generally indicated by an arrow 430. Subsequently, the surface coating is moved through the channels 412, as generally indicated by arrows 432, and dispensed out of the corresponding openings 418 onto the surface 124 of the workpiece 120, as generally indicated by arrows 434.

In some examples, the diverging channels 412 are angled at 5 to 20 degrees from a central axis 450 (e.g., the diverging channels 412 are angled at 10 to 40 degrees from one another). Additionally or alternatively, some or all of the diverging channels 412 are angled away from the central axis 450 at equivalent angles. In some examples, a rate of rotation (e.g., a spin rate) of the applicator 224 is controlled based on a desired amount of surface coating to be applied to the workpiece 120, a thickness of the surface coating to be applied to the workpiece 120, a type of surface coating, a degree of defect filling required, etc. Additionally or alternatively, the rate of rotation of the applicator 224 is varied based on different application stages of the surface coating (e.g., a slower rate of rotation when the surface coating is first being applied, then a faster rate of rotation as the process progresses and vice-versa). Additionally or alternatively, a pump is implemented at or proximate the applicator 224 to cause the surface coating to flow toward and out from the applicator 224.

Figure 5A:
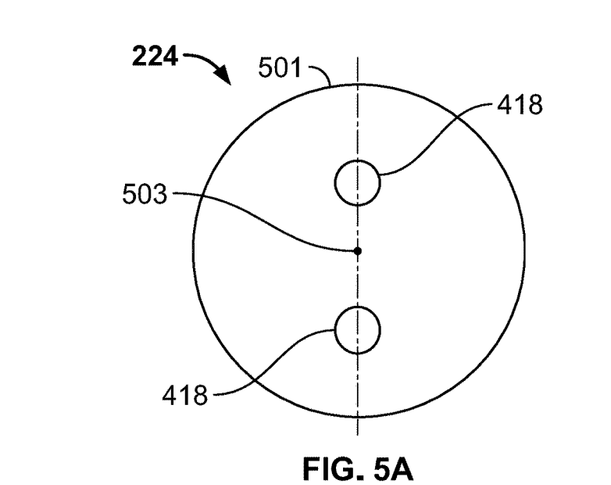
FIGS. 5A-5D are bottom views of example applicators that can be implemented in examples disclosed herein.

FIGS. 5A-5D are bottom views of example applicator geometries that can be implemented in examples disclosed herein. Turning to FIG. 5A, a bottom view of the example applicator 224 of FIGS. 2-4 is shown. According to the illustrated example, the applicator 224 exhibits a generally circular overall shape (e.g., exterior shape, exterior outline, etc.) 501. In this example, the openings 418 are oppposedly arranged from a center (e.g., a geometric center) 503 of the applicator 224. In other words, the openings 418 are arranged 180 degrees apart from one another at an equal radial distance from the aforementioned center 503.

Figure 5B:
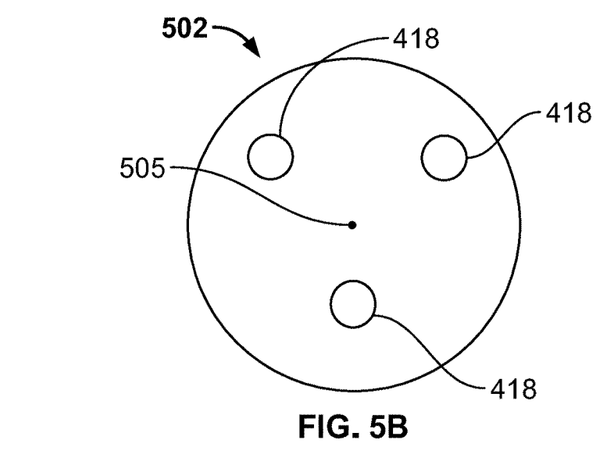

FIG. 5B is a bottom view of another example applicator 502. In this example, the applicator 502 includes three of the openings 418. In particular, the openings 418 are arranged along a same radius extending from a center 505 of the applicator 502. Further, in this example, the openings 418 are arranged equiangular (e.g., concentrically arranged 120 degrees apart from one another).

Figure 5C:
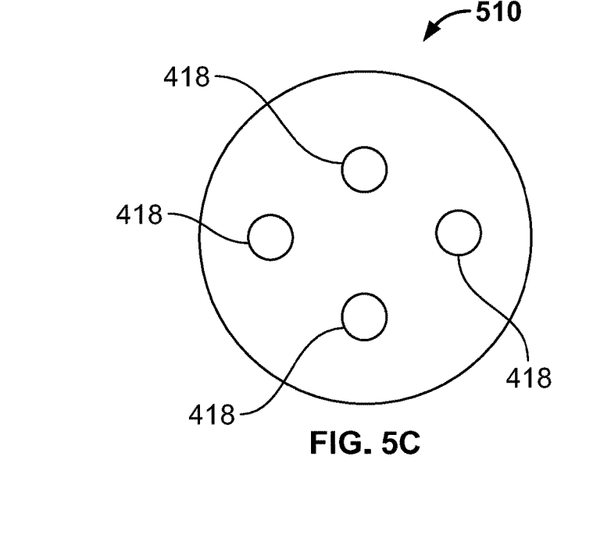

Turning to FIG. 5C, an alternative example applicator 510 is shown. The applicator 510 of the illustrated example includes four of the openings 418 arranged at 90 degree intervals and positioned at a same radius.

Figure 5D:
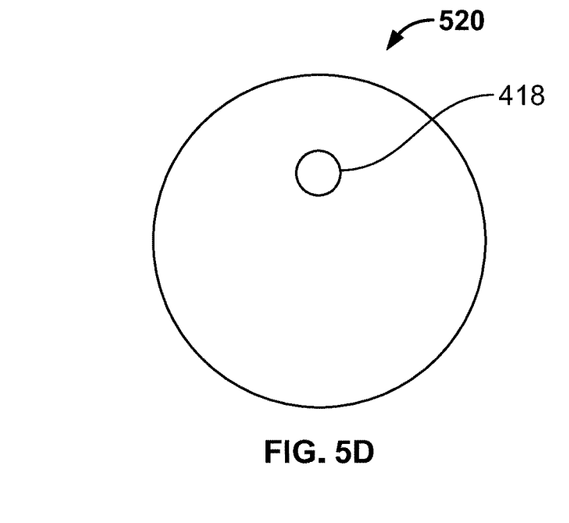

FIG. 5D depicts yet another example applicator 520 with a single one of the openings 418. In particular, the opening 418 is placed off-center in this example.

While the applicators 224, 502, 510, 520 of FIGS. 5A-5D are shown exhibiting a generally circular shape, any appropriate shape, outline and/or geometry can be implemented instead (e.g., elliptical, square, trapezoidal, polygonal, etc.). Further, while many of the examples shown and described in connection with FIGS. 5A-5D include the openings 418 positioned at the same radius, the openings 418 can be positioned at different radii instead (e.g., asymmetric and/or irregular positioning of the openings 418). Further, the openings 418 can have the same or different sizes and/or diameters. In other examples, the openings 418 are arranged in a grid pattern or layout.

Figure 6:
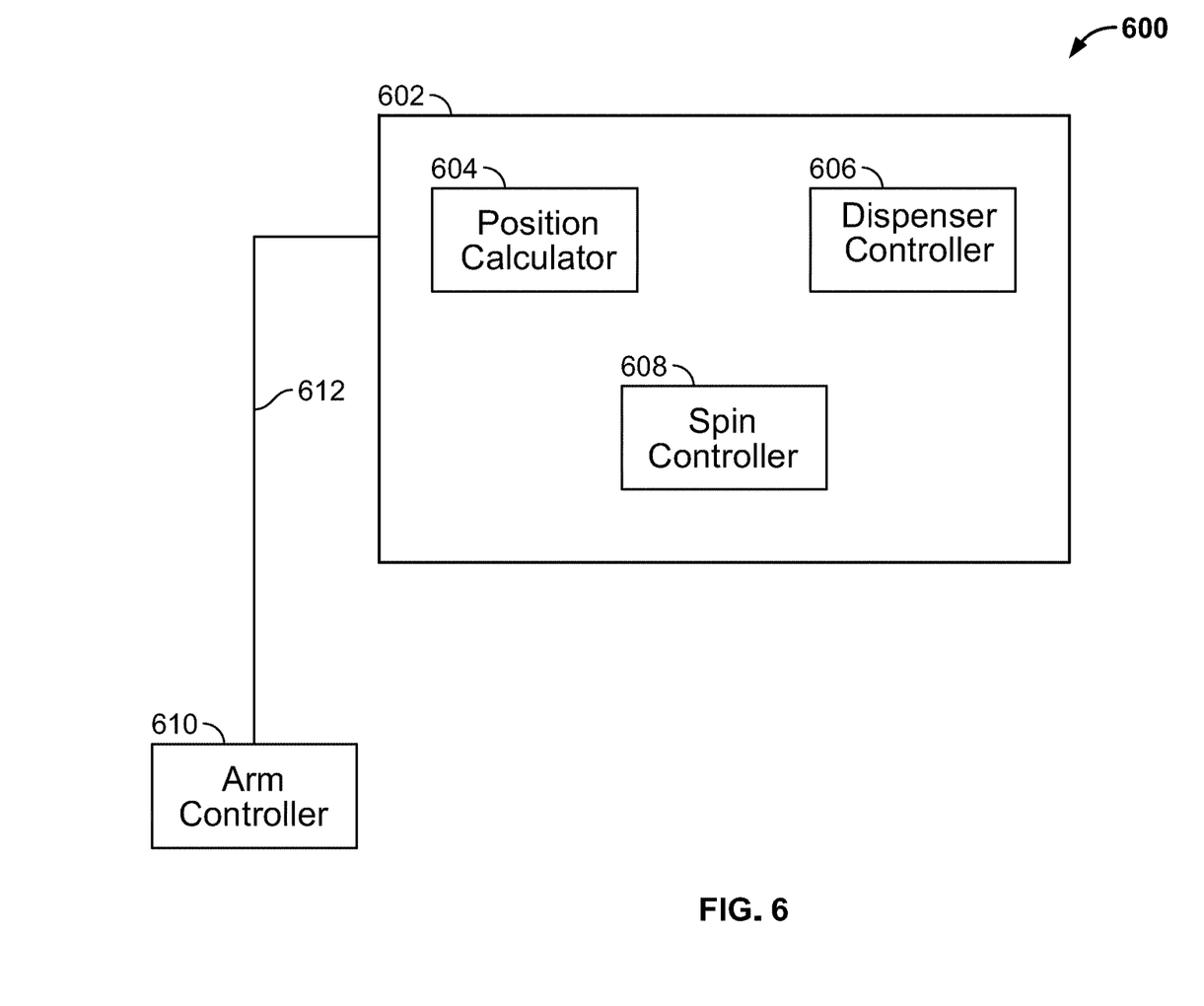
FIG. 6 is a schematic of a surface coating application control system that can be used to implement examples disclosed herein.

FIG. 6 is a schematic of a surface coating application control system 600 that can used to implement examples disclosed herein. The surface coating application control system 600 of the illustrated example includes a surface coating application analyzer 602, which includes a position calculator 604, a dispenser controller 606, and a spin controller (e.g., a rotation controller) 608. The application control system 600 also includes an example arm controller 610 that is communicatively coupled to the aforementioned surface coating analyzer 602 via a communication line 612. The example surface coating application control system 600 can be implemented in the robot 101, the effector 114 and/or a control system (e.g., a control network) communicatively coupled with the robot 101, for example.

According to the illustrated example, the position calculator 604 determines and/or calculates a desired movement of the robot 101 and/or the effector 114 relative to the workpiece 120. In particular, the position calculator determines a translational movement of the robot 101 and/or articulated movement of the effector 114 to position the applicator 224 in contact with the surface 124 of the workpiece 120. In some examples, the position calculator 604 takes a curvature of the surface 124 into account when determining the desired movement of the robot 101 and/or the effector 114. Additionally or alternatively, the position calculator 604 control a position and/or linear movement of the actuator 210 to vary a pressure of the applicator 224 provided to the surface 124.

In this example, the dispenser controller 606 controls the filler tank pump 108 based on a desired amount of the surface coating to be applied to the surface 124. Additionally or alternatively, the amount of the surface coating to be applied to the surface 124 is based on whether the surface coating is being initially applied (e.g., less surface coating provided when the coating process has just begun). In some examples, the amount of the surface coating to be applied is based on manufacturing parameters or needs (e.g., a material of the workpiece 120, a type of surface coating to be applied, a desired surface finish of the workpiece 120, a desired fill of defects, etc.).

The spin controller 608 of the illustrated example controls and/or varies a rotational rate of spin (e.g., a rotational speed) of the central shaft 220 and, in turn, the applicator 224. The spin controller 608 may vary the rotation based on a desired amount of surface coating, a desired degree of defect filling, surface coating characteristics or properties, a desired finish of the surface 124 and/or properties of the surface 124. In some examples, the rate of rotation of the central shaft 220 is based on a pressure applied by the applicator 224 onto the surface 124.

While an example manner of implementing the surface coating application control system 600 of FIG. 6 is illustrated in FIG. 6, one or more of the elements, processes and/or devices illustrated in FIG. 6 may be combined, divided, re-arranged, omitted, eliminated and/or implemented in any other way. Further, the example position calculator 604, the example dispenser controller 606, the example spin controller 608, the example arm controller 610 and/or, more generally, the example surface coating application control system 600 of FIG. 6 may be implemented by hardware, software, firmware and/or any combination of hardware, software and/or firmware. Thus, for example, any of the example the example position calculator 604, the example dispenser controller 606, the example spin controller 608, the example arm controller 610 and/or, more generally, the example surface coating application control system 600 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, the example position calculator 604, the example dispenser controller 606, the example spin controller 608, and/or the example arm controller 610 is/are hereby expressly defined to include a non-transitory computer readable storage device or storage disk such as a memory, a digital versatile disk (DVD), a compact disk (CD), a Blu-ray disk, etc. including the software and/or firmware. Further still, the example surface coating application control system 600 of FIG. 6 may include one or more elements, processes and/or devices in addition to, or instead of, those illustrated in FIG. 6, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 7:
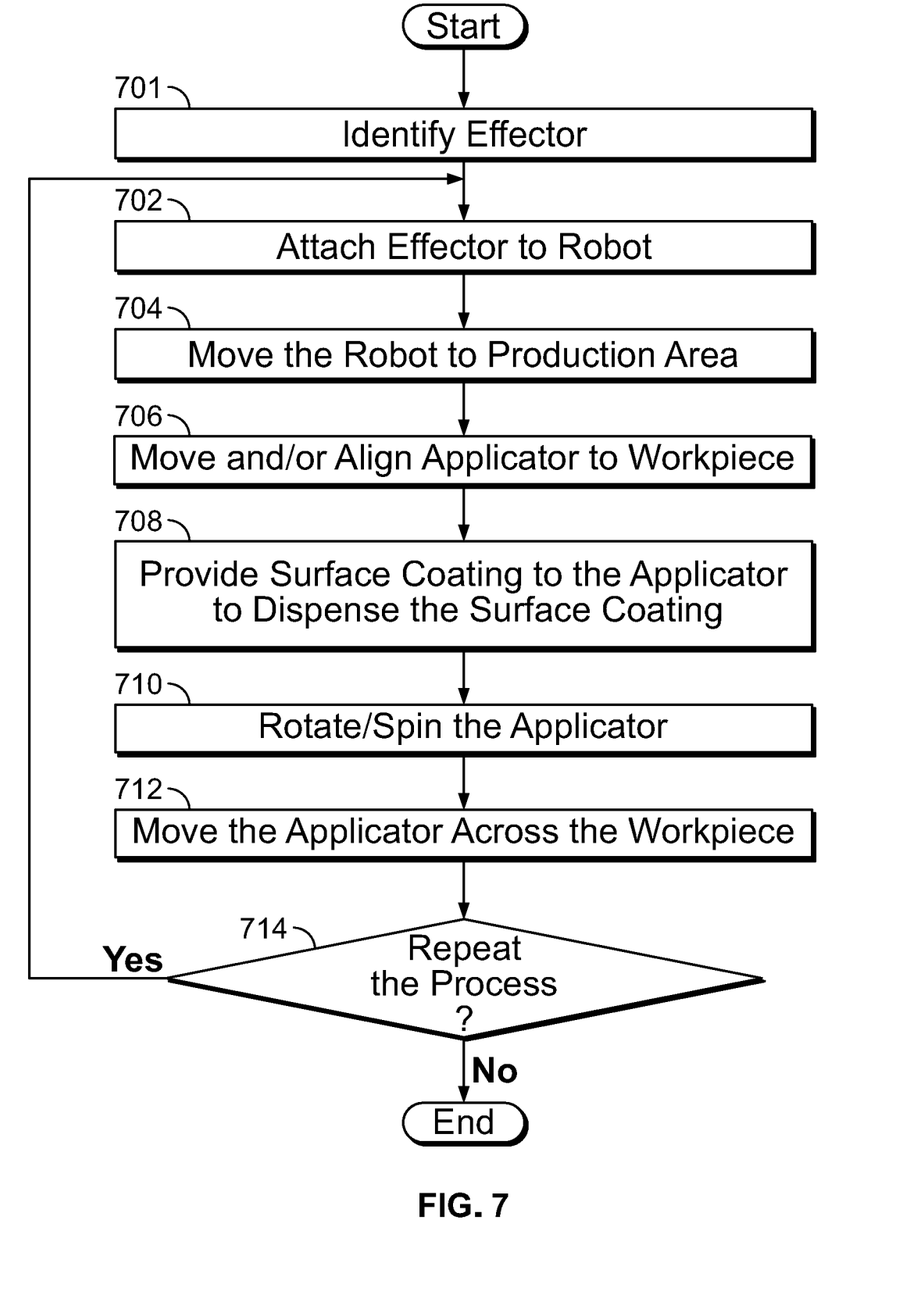
FIG. 7 is a flowchart representative of machine readable instructions that can be implemented in examples disclosed herein.

A flowchart representative of example hardware logic, machine readable instructions, hardware implemented state machines, and/or any combination thereof for implementing the surface coating application control system 600 of FIG. 6 is shown in FIG. 7. The machine readable instructions may be one or more executable programs or portion(s) of an executable program for execution by a computer processor such as the processor 812 shown in the example processor platform 800 discussed below in connection with FIG. 8. The program may be embodied in software stored on a non-transitory computer readable storage medium such as a CD-ROM, a floppy disk, a hard drive, a DVD, a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowchart illustrated in FIG. 7, many other methods of implementing the example surface coating application control system 600 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, etc. in order to make them directly readable and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein. In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

As mentioned above, the example process of FIG. 7 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

The example method 700 of FIG. 7 begins as defects (e.g., relatively small pits, surface imperfections, microscopic holes, etc.) at the surface 124 of the workpiece 120 are to be filled and/or covered with a surface coating. In particular, the example robot 101 will be utilized to provide the surface coating to the surface 124.

At block 701, in some examples, the robot 101 and/or the arm controller 610 identifies the effector 114 to be used. In particular, the robot 101 detects the identification module 206 to select the effector 114 from multiple other effectors.

At block 702, the effector 114 is attached/coupled to the robot 101 by the arm controller 610. In this example, the arm controller 610 directs movement of the robot 101 to couple the mounting portion 202 to the rotatable joint 112.

At block 704, once the effector 114 is attached to the robot 101, the robot 101 is moved to a production area (e.g., a work area, a surface processing area, etc.) in which the workpiece 120 is located. In this example, the robot 101 is moved by the movable base 130.

According to the illustrated example, the applicator 224 is moved and/or aligned (e.g., oriented) relative to the workpiece 120 and/or the surface 124 by the position calculator 604 (block 706). In some examples, the applicator 224 is aligned to the surface 124 by the position calculator 604 based on a contour and/or curvature of the surface 124.

At block 708, the dispenser controller 606 of the illustrated example causes the filler tank pump 108 to provide (e.g., push, pump, etc.) the surface coating from the inlet 402 out through the openings 418 of the applicator 224. In particular, the dispenser controller 606 varies a degree to which the surface coating is dispensed from the applicator 224 by controlling the filler tank pump 108.

At block 710, the spin controller 608 causes the applicator 224 to spin/rotate. In particular, the spin controller 608 controls the motor 214 to rotate the gears 422, 424 and, thus, the central shaft 220 along with the applicator 224 as the applicator 224 dispenses the surface coating therefrom.

At block 712, the position calculator 604 and/or the arm controller 610 directs the robot 101, the actuator 210 and/or the effector 114 to move the applicator 224 across the surface 124 of the workpiece 120. In particular, the applicator 224 is moved and rotated to dispense the surface coating across at least a portion of the surface 124. In other examples, the applicator 224 is not rotated as it is moved across the surface 124. In some examples, the applicator 224 is moved in a pattern resembling rows or columns. In other examples, the applicator 224 is moved in an irregular pattern, such as zig-zag movement, for example.

At block 714, it is determined whether to repeat the process. If the process is to be repeated (block 714), control of the process returns to block 702. Otherwise, the process ends. This determination may be based on whether there are additional workpieces to be processed, for example.

Figure 8:
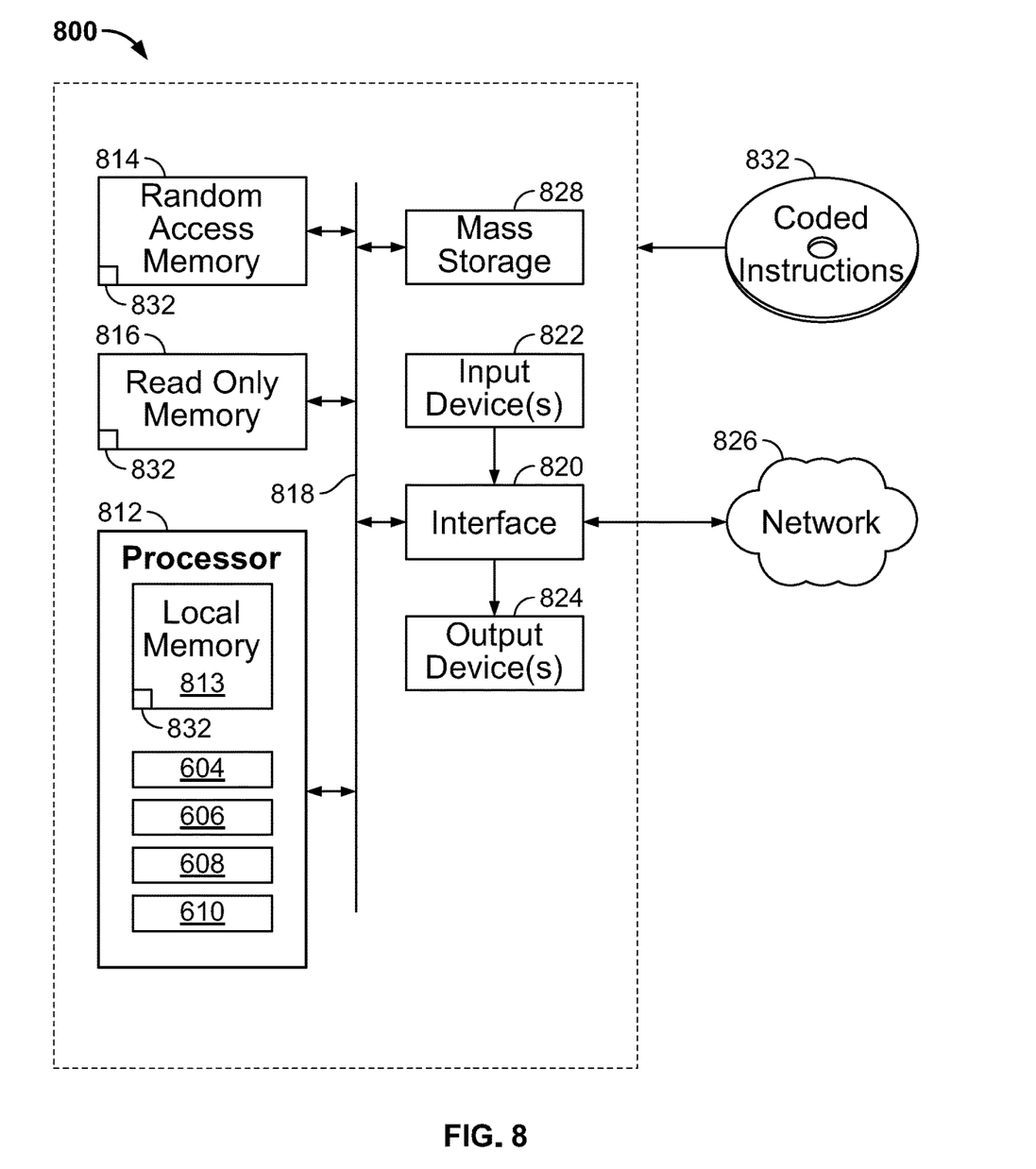
FIG. 8 is a block diagram of an example processing platform structured to execute the instructions of FIG. 7 to implement the example surface coating application system of FIG. 1 and/or the example surface coating application control system of FIG. 6.

FIG. 8 is a block diagram of an example processor platform 800 structured to execute the instructions of FIG. 7 to implement the surface coating application control system 600 of FIG. 6. The processor platform 800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 800 of the illustrated example includes a processor 812. The processor 812 of the illustrated example is hardware. For example, the processor 812 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example position calculator 604, the example dispenser controller 606, the example spin controller 608 and the example arm controller 610.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), a Bluetooth® interface, a near field communication (NFC) interface, and/or a PCI express interface.

In the illustrated example, one or more input devices 822 are connected to the interface circuit 820. The input device(s) 822 permit(s) a user to enter data and/or commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 820 of the illustrated example, thus, typically includes a graphics driver card, a graphics driver chip and/or a graphics driver processor.

The interface circuit 820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 826. The communication can be via, for example, an Ethernet connection, a digital subscriber line (DSL) connection, a telephone line connection, a coaxial cable system, a satellite system, a line-of-site wireless system, a cellular telephone system, etc.

The processor platform 800 of the illustrated example also includes one or more mass storage devices 828 for storing software and/or data. Examples of such mass storage devices 828 include floppy disk drives, hard drive disks, compact disk drives, Blu-ray disk drives, redundant array of independent disks (RAID) systems, and digital versatile disk (DVD) drives.

The machine executable instructions 832 of FIG. 7 may be stored in the mass storage device 828, in the volatile memory 814, in the non-volatile memory 816, and/or on a removable non-transitory computer readable storage medium such as a CD or DVD.

Example 1 includes an apparatus having an inlet to receive a surface coating to be applied to a surface of a workpiece, a shaft having a fluid channel extending therethrough, where the fluid channel is in fluid communication with the inlet, and an applicator coupled to an end of the shaft, where the applicator has an opening in fluid communication with the fluid channel. The apparatus also includes a pump to cause the surface coating to flow from the inlet to the opening, and a motor to rotate the shaft while the applicator dispenses the surface coating from the opening.

Example 2 includes the apparatus of Example 1, and further includes an actuator to vary a pressure between the applicator and the surface.

Example 3 includes the apparatus of Example 1, and further includes at least one of a gear, drive belt or chain operatively coupled between the motor and the shaft.

Example 4 includes the apparatus of Example 1, and further includes a mount to couple the apparatus to a robot.

Example 5 includes the apparatus of Example 1, where the applicator has a circular shape.

Example 6 includes the apparatus of Example 5, where the opening includes a first opening, where the applicator further includes a second opening, and where the first and second openings are arranged across a center defined by the circular shape.

Example 7 includes the apparatus of Example 6, where the fluid channel is a first fluid channel, and where second and third fluid channels fluidly coupled to the first and second openings, respectively, are angled at 25 to 35 degrees from one another.

Example 8 includes the apparatus of Example 5, where the opening includes a first opening, where the applicator further includes second and third openings, and where the first, second and third openings are concentrically arranged 120 degrees apart from one another.

Example 9 includes the apparatus of Example 1, where the fluid channel is an internal cavity defined by an exterior diameter of the shaft.

Example 10 includes an effector for use with a robot. The example effector includes a mount to removably couple the effector to the robot, an inlet to receive surface coating to be dispensed to a surface of a workpiece, an applicator having an opening, a pump to cause the surface coating to flow from the inlet to the opening, and a motor to rotate the applicator while the surface coating is dispensed from the opening and onto the surface.

Example 11 includes the effector of Example 10, where the motor is to rotate the applicator via a shaft having a fluid channel extending therethrough.

Example 12 includes the effector of Example 10, and further includes an identification module to identify the effector.

Example 13 includes the effector of Example 10, where the applicator has a circular shape.

Example 14 includes the effector of Example 10, where the opening includes a first opening, where the applicator further includes a second opening, and where the first and second openings are arranged at different radii from a center defined by the circular shape.

Example 15 includes the effector of Example 10, where the opening includes a first opening, where the applicator further includes second and third openings, and where the first, second and third openings are concentrically arranged 120 degrees apart from one another Example 16 includes an example method of operating an effector to apply a surface coating to a surface of a workpiece. The example method includes moving, via instructions executed by a processor, the effector relative to the surface of the workpiece, rotating, via a motor, an applicator at a distal end of the effector, and dispensing the surface coating from an opening of the applicator to the surface while the applicator is rotated.

Example 17 includes the method of Example 16, and further includes coupling the effector to a robot.

Example 18 includes the method of Example 17, and further includes including identifying, via instructions executed by the processor, an identification module of the effector prior to coupling the effector to the robot.

Example 19 includes the method of Example 16, where the effector is moved, via a robot removably coupled to the effector, across the surface while the surface coating is dispensed to the surface.

Example 20 includes the method of Example 16, and further includes varying a rotational speed of the motor based on a desired amount of the surface coating to be applied or a degree to which defects of the surface are to be filled.

From the foregoing, it will be appreciated that example methods, apparatus and articles of manufacture have been disclosed that provide an effective, relatively low-cost and quick application of a surface treatment (e.g., a surface coating) onto a surface (e.g., a workpiece surface). As a result, production throughput can be significantly increased.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent. While examples disclosed herein are related to applying a surface coating to a surface via a production robot, the examples disclosed herein can be applied to any appropriate process involving dispensing of materials to a surface and/or object.

What is claimed is:

1. An apparatus comprising:
an inlet to receive a surface coating to be applied to a surface of a workpiece;
a shaft having a fluid channel extending therethrough, the fluid channel in fluid communication with the inlet;
an applicator coupled to an end of the shaft, the applicator having first and second openings in fluid communication with the fluid channel, the first and second openings on an applicator surface at a first side of the applicator opposite from a second side of the applicator that is proximate the shaft;
a backing pad to support the applicator, the backing pad including first and second backing pad channels fluidly coupled to the first and second openings, respectively, the first and second backing pad channels extending in a direction normal to the applicator surface;
a pump to cause the surface coating to flow from the inlet to the first and second openings; and
a motor to rotate the shaft about an axis of rotation while the applicator dispenses the surface coating from the first and second openings, the first opening positioned at a first distance from the axis of rotation, the second opening positioned at a second distance from the axis of rotation different from the first distance.

2. The apparatus as defined in claim 1, further including an actuator to vary a pressure between the applicator and the surface.

3. The apparatus as defined in claim 1, further including at least one of a gear, drive belt or chain operatively coupled between the motor and the shaft.

4. The apparatus as defined in claim 1, further including a mount to couple the apparatus to a robot.

5. The apparatus as defined in claim 1, wherein the applicator has a circular shape.

6. The apparatus as defined in claim 5, wherein the first and second openings are arranged at different distances from a center defined by the circular shape.

7. The apparatus as defined in claim 1, wherein the fluid channel is a first fluid channel, and further including second and third fluid channels fluidly coupled to the first and second openings, respectively, the second and third fluid channels angled at 25 to 35 degrees from one another.

8. The apparatus as defined in claim 1, further including a third opening of the applicator, and wherein the first, second and third openings are arranged 120 degrees apart from one another on the applicator.

9. The apparatus as defined in claim 1, wherein the fluid channel is an internal cavity defined by an exterior diameter of the shaft.

10. An effector for use with a robot, the effector comprising:
a mount to removably couple the effector to the robot;
an inlet to receive surface coating to be dispensed to a surface of a workpiece;
a shaft having a fluid channel extending therethrough;
an applicator having first and second openings, the first and second openings on an applicator surface at a first side of the applicator opposite from a second side of the applicator that is proximate the shaft, the first and second openings in fluid communication with the fluid channel;
a backing pad to support the applicator, the backing pad including first and second backing pad channels fluidly coupled to the first and second openings, respectively, the first and second backing pad channels extending in a direction normal to the applicator surface;
a pump to cause the surface coating to flow from the inlet to the first and second openings; and
a motor to rotate the applicator about an axis of rotation while the surface coating is dispensed from the first and second openings and onto the surface, the first opening positioned at a first distance from the axis of rotation, the second opening positioned at a second distance from the axis of rotation different from the first distance.

11. The effector as defined in claim 10, further including an identification module to identify the effector.

12. The effector as defined in claim 10, wherein the applicator has a circular shape.

13. The effector as defined in claim 12, wherein the first and second openings are arranged at different radii from a center defined by the circular shape.

14. The effector as defined in claim 10, further including a third opening of the applicator, and wherein the first, second and third openings are arranged 120 degrees apart from one another on the applicator.

15. The apparatus as defined in claim 1, wherein the first and second openings extend normal to the applicator surface.

16. An apparatus comprising:
an inlet to receive a surface coating to be applied to a surface of a workpiece;
a shaft having a first fluid channel extending therethrough, the first fluid channel in fluid communication with the inlet;
an applicator coupled to an end of the shaft, the applicator having first and second openings in fluid communication with the first fluid channel, the first and second openings on an applicator surface at a first side of the applicator opposite from a second side of the applicator that is proximate the shaft, and wherein a second fluid channel extends from the second opening and angled at 25 to 35 degrees from the first fluid channel, the first and second openings extending in a direction normal to the applicator surface to meet the first and second fluid channels;
a pump to cause the surface coating to flow from the inlet to the first and second openings; and
a motor to rotate the shaft about an axis of rotation while the applicator dispenses the surface coating from the first and second openings, the first opening positioned at a first distance from the axis of rotation, the second opening positioned at a second distance from the axis of rotation different from the first distance.

17. The apparatus as defined in claim 1, further including a third opening on the applicator surface, the third opening fluidly coupled to the fluid channel, the third opening positioned at a third distance away from the axis of rotation, the third distance different from at least one of the first or second distances.

18. The apparatus as defined in claim 17, wherein the third distance is different from the first and second distances.

19. The apparatus as defined in claim 1, wherein the first and second openings have different opening diameters.

20. The apparatus as defined in claim 1, wherein the first and second openings are offset from the axis of rotation.

* * * * *